(12) United States Patent
Etter

(10) Patent No.: US 6,860,477 B2
(45) Date of Patent: Mar. 1, 2005

(54) CLAMPING DEVICE

(75) Inventor: Ernst Etter, Thalwil (CH)

(73) Assignee: Vischer & Bolli, Dubendorf (DE)

(*) Notice: Subject to any disclaimer, the term of this patent is extended or adjusted under 35 U.S.C. 154(b) by 0 days.

(21) Appl. No.: 10/364,687

(22) Filed: Feb. 12, 2003

(65) Prior Publication Data

US 2004/0051225 A1 Mar. 18, 2004

(30) Foreign Application Priority Data

Feb. 26, 2002 (EP) .......................................... 02 004 191

(51) Int. Cl.⁷ .............................................. B23Q 3/00
(52) U.S. Cl. ..................................... 269/309; 269/310
(58) Field of Search ............................... 269/309, 310, 269/32; 279/2.06, 4.06; 409/219, 225

(56) References Cited

U.S. PATENT DOCUMENTS

| | | | | |
|---|---|---|---|---|
| 5,961,261 A | * | 10/1999 | Stark | 409/219 |
| 6,273,434 B1 | * | 8/2001 | Stark | 279/4.06 |
| 6,283,465 B1 | * | 9/2001 | Etter | 269/309 |
| 6,530,568 B2 | * | 3/2003 | Etter | 269/309 |
| 2004/0051225 A1 | * | 3/2004 | Etter | 269/309 |

FOREIGN PATENT DOCUMENTS

| | | |
|---|---|---|
| DE | 4135418 A1 | 5/1993 |
| DE | 19636375 A1 | 3/1998 |
| DE | 19703354 C1 | 3/1998 |
| DE | 20003729 U1 | 6/1999 |
| DE | 20104008.5 | 7/2002 |
| EP | 0943396 A1 | 9/1999 |
| EP | 1238751 A2 | 9/2002 |

* cited by examiner

Primary Examiner—Lee D. Wilson
(74) Attorney, Agent, or Firm—Liniak, Berenato & White, LLC

(57) ABSTRACT

The invention concerns a clamping device for retaining a draw-in bolt (11) on a machine table, a clamping plate, or the like, having a receptacle (10) into which the draw-in bolt (11) is insertable, and having a clamping mechanism in order to retain the draw-in bolt (11) in the receptacle (10), the clamping mechanism having a collet chuck having several clamping tongues (13) which at their one end are retained on a holding element (14) arranged in the receptacle (10), and at their free end are movable between a radially inner clamping position and an outer release position, and are lockable in the clamping position by way of a piston (5). The clamping device according to the present invention is characterized in that the holding element (14) with the clamping tongues (13) is axially displaceable, and is arranged in the receptacle (10) with radial clearance.

3 Claims, 3 Drawing Sheets

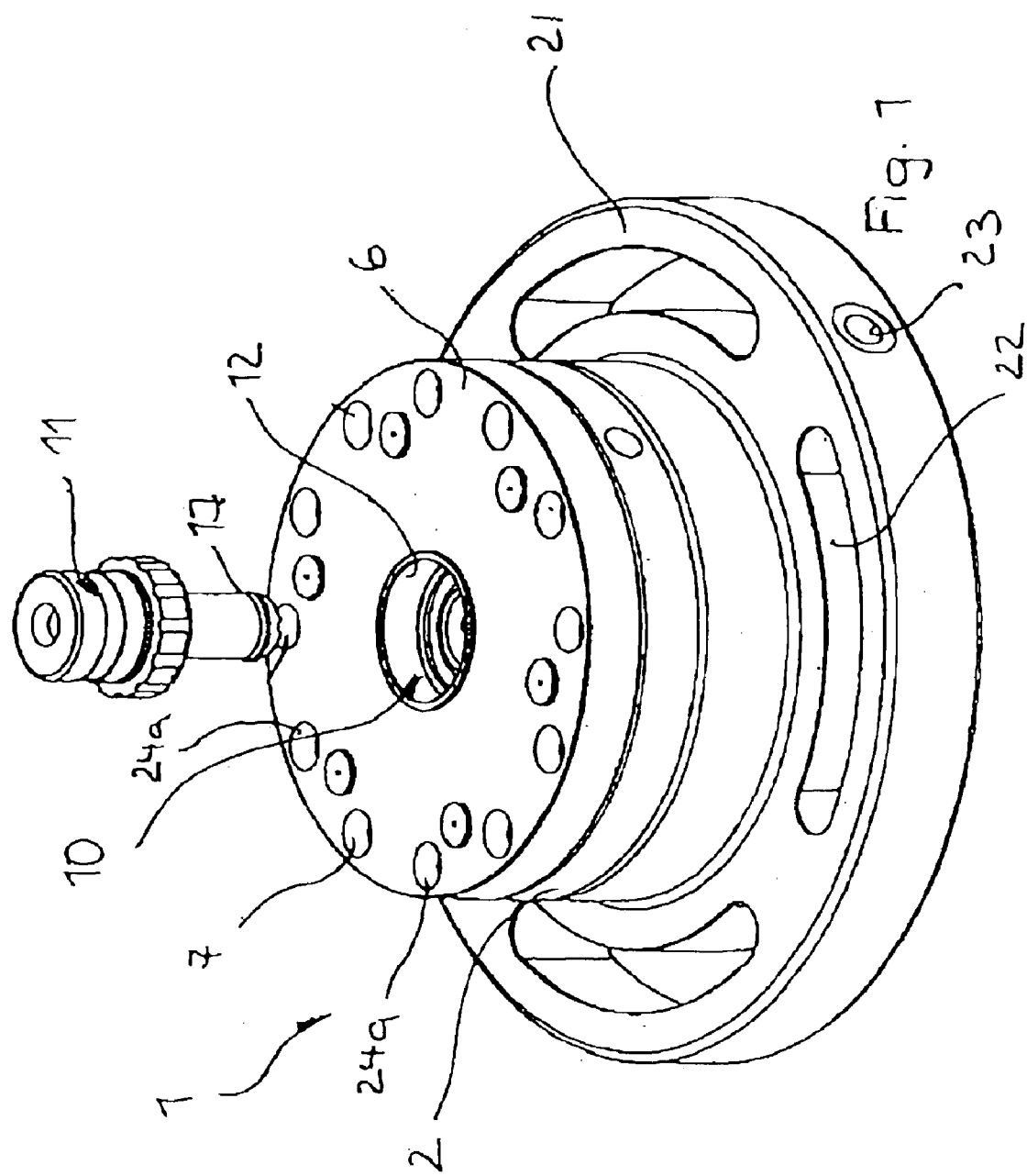

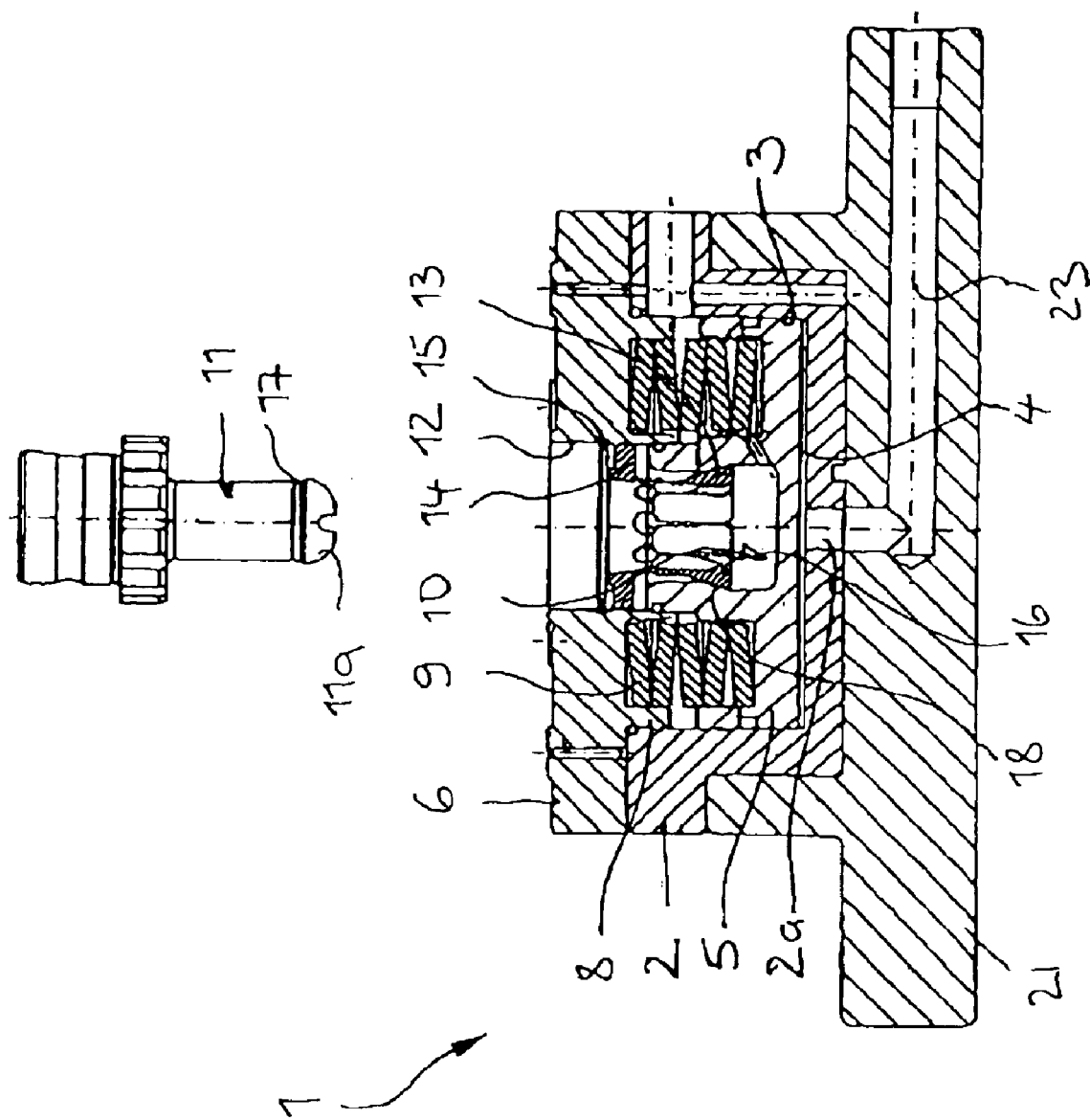

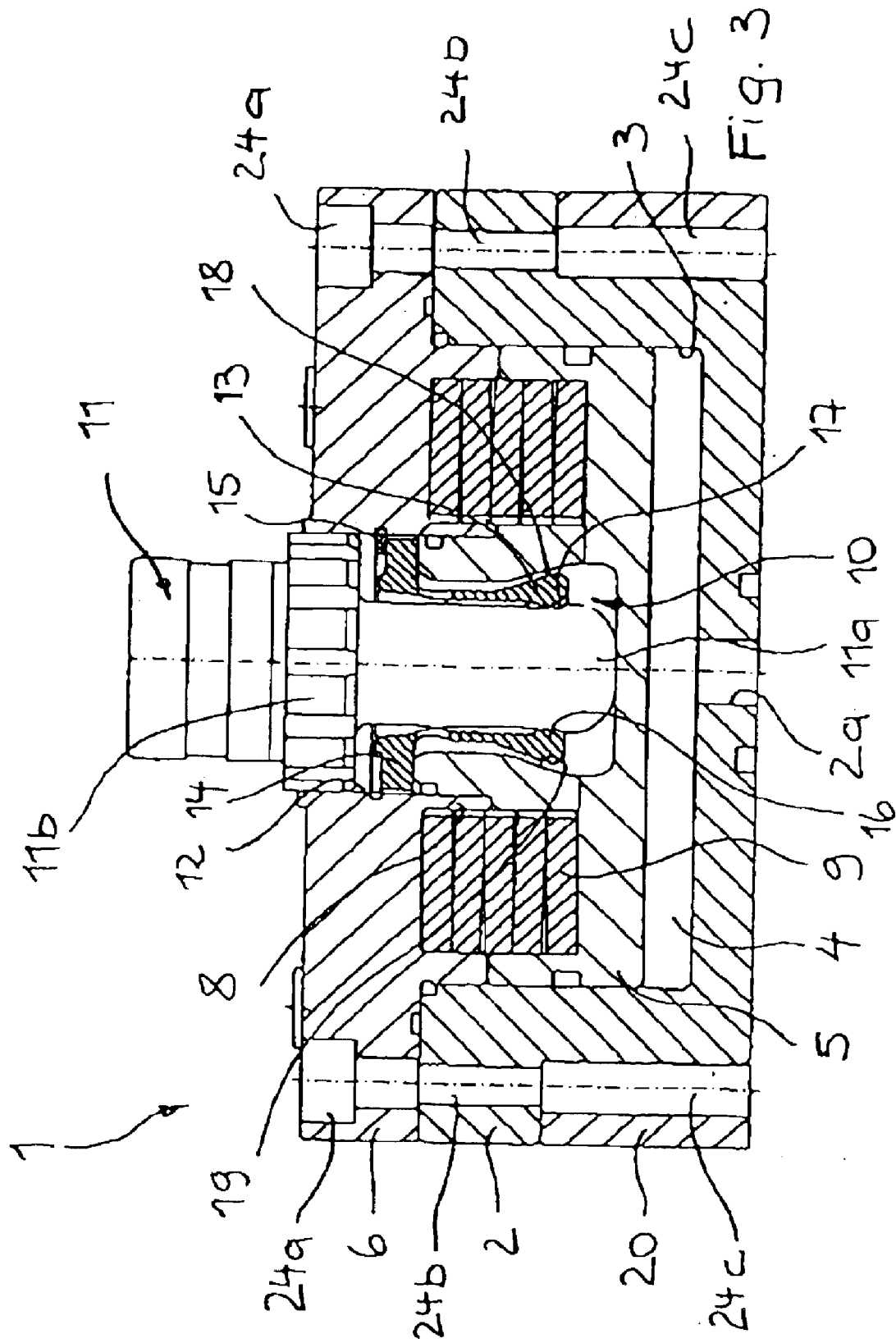

CLAMPING DEVICE

CROSS-REFERENCE TO RELATED APPLICATIONS

This application claims priority under 35 U.S.C. § 119 to European Patent Application number 02 004 191.9, filed Feb. 26, 2002, the disclosure of which is incorporated herein by reference.

FIELD OF THE INVENTION

The present invention concerns a clamping device for retaining a draw-in bolt on a machine table, a clamping plate, or the like, having a receptacle into which the draw-in bolt is insertable, and having a clamping mechanism in order to retain the draw-in bolt in the receptacle, the clamping mechanism having a collet chuck having several clamping tongues which at their one end are retained on a holding element arranged in the receptacle, and at their free end are removable between a radially inner clamping position and an outer release position, and are lockable in the clamping position by way of a piston.

BACKGROUND OF THE INVENTION

Clamping devices of this kind are known from DE 200 03 729 U1. In these clamping devices, retention of a draw-in bolt in the receptacle of the clamping device is accomplished here by way of a collet chuck that has multiple resilient clamping tongues which at one of their end regions are retained on an annular element held in the receptacle, and in the region of their free ends are movable with elastic deformation between a radially inner clamping position and a radially outer release position. Provided for actuation of the clamping mechanism is a piston that is pressed by a spring packet into a lower closed position in which the clamping tongues are pressed radially inward into their clamping position, and that is movable hydraulically into an upper release position in which it releases the clamping tongues so that the latter can deflect radially outward.

The clamping mechanism furthermore possesses a hydraulically or pneumatically actuable opening piston that is in engagement with the clamping tongues on the inner side in such a way that the free ends of the clamping tongues can be spread out into the release position by an axial motion of the opening piston, and the draw-in bolt can thus be removed from the receptacle or inserted thereinto.

The known clamping mechanism has proven entirely successful in practical use. It is nevertheless regarded as disadvantageous in that it possesses a relatively complex configuration. Another criticism occasionally expressed is that the clamping device is cumbersome to handle, since the draw-in bolt must be positioned exactly in the clamping device so that the clamping mechanism operates reliably.

SUMMARY OF THE INVENTION

It is therefore the object of the present invention to describe a clamping device of the kind cited initially which possesses a simple configuration, operates reliably, and is simple to handle.

This object is achieved, according to the present invention, in that the holding element with the clamping tongues is axially displaceable, and is arranged in the receptacle with radial clearance. With this radially floating and axially displaceable arrangement of the collet chuck, not only holding forces but also large draw-in forces can be transferred. In addition, manufacturing errors can be compensated for so that reliable operation is guaranteed.

In an embodiment of the invention, provision is made for the clamping tongues, in their initial position, to assume the clamping position in which they are in contact with a contact surface of a draw-in bolt inserted into the clamping device, the contact surface being provided in the transition region to a thickened bolt head. The result of this configuration is that the clamping device does not require a separate opening mechanism, since the draw-in bolt, equipped with a corresponding contour, presses the clamping tongues radially outward when the draw-in bolt is pulled out of the receptacle or inserted thereinto.

Lastly, provision is made in a manner known per se for the clamping tongues, in the region of their free ends, to diverge externally in conical form, forming on their outer sides oblique surfaces that coact with a tapered surface machined onto the piston in order to press the clamping tongues radially inward against a draw-in bolt inserted into the receptacle when the piston is in its clamping position. The result of this is that in the context of the clamping operation, the tapered contour machined into the piston converts an axial motion of the piston into an axial and radial clamping motion of the piston. As it travels in, the clamping bolt is held lightly by the preload of the clamping tongues, and is then pulled into the cylinder in the context of the clamping operation.

DESCRIPTION OF THE DRAWINGS

Regarding further advantageous embodiments of the invention, the reader is referred to the dependent claims and to the explanation below of exemplary embodiments with reference to the appended drawings, in which:

FIG. 1 shows a clamping device according to the present invention embodied as a surface-mount cylinder, in a perspective view;

FIG. 2 shows the clamping device of FIG. 1 in section along line II—II, with the clamping mechanism actuated; and FIG. 3 shows a clamping device according to the present invention embodied as a flush-mount cylinder, in a longitudinal section corresponding to FIG. 2 and with the clamping mechanism released.

DETAILED DESCRIPTION OF THE PREFFERED EMBODIMENT(S)

The Figures depict two variants of a mechanical/hydraulic clamping device 1 according to the present invention which serves e.g. to clamp a support pallet, having a workpiece mounted thereon and a draw-in bolt provided on the rear side thereof, immovably on a machine table, a baseplate, or the like. The two clamping devices 1 shown possess substantially the same basic configuration and the same manner of operation, as described below.

Clamping devices 1 each encompass a base element 2 that forms a cylindrical bore 3 into which a piston is inserted in axially movable fashion, forming a pressure chamber 4. A conduit 2a formed in base element 2, through which a hydraulic medium can be conveyed to pressure chamber 4 opens into the bottom of pressure chamber 4.

The open upper side of base element 2 is closed off by a cover 6 that rests on a flange of base element 2 and on which base element 2 is retained by six screws 7. Configured on the underside of the cover is a centering extension 8 that is dimensioned with an exact fit to the diameter of cylinder bore 3, so that cover 6 can be positioned accurately on base element 2. Arranged between cover 6 and piston 5 is a cup spring packet 9 that impinges downwardly on piston 5 in the direction of the bottom of cylinder bore 3.

Provided in the upper side of piston 5, opposite pressure chamber 4, is a blind hole which forms a receptacle 10 for a draw-in bolt 11 that can be inserted into receptacle 10 through a passthrough hole 12 provided in cover 6.

For retention of draw-in bolt 11 in receptacle 10, a clamping mechanism is provided that is actuable by axial motion of piston 5, and that has a collet chuck. This collet chuck possesses several clamping elements 13, arranged along the periphery of receptacle 10 and embodied in tongue-like fashion, that are held at their upper ends on a holding ring 14, such that clamping tongues 13 can be elastically spread apart or pressed together in the region of their free ends. Holding ring 14 is inserted into passthrough hole 12 of cover 6 and is held therein axially displaceably and with radial clearance (in floating fashion), the axial travel upward being limited by a snap ring 15 retained on cover 6.

In the region of their free lower ends, clamping tongues 13 have engagement lugs 16 which, in their initial position depicted in FIG. 1, are in contact with a draw-in bolt 11 inserted into clamping device 1 in order to retain said bolt in receptacle 10. A corresponding contact surface 17 in the transition region to the thickened bolt head 11a, by way of which axial retention is accomplished, is provided on draw-in bolt 11.

As is clearly evident from the drawings, clamping tongues 13 diverge externally in conical form in the region of their free ends, forming oblique surfaces 18 on their outer sides. These oblique surfaces 18 coact with a tapered surface 19 machined onto piston 5 in order to press clamping tongues 13, in their starting position, radially inward against a draw-in bolt 11 inserted into receptacle 10, when piston 5 is moved out of its upper release position depicted in FIG. 3 downward into the lower clamping position depicted in FIG. 2.

Concretely, FIG. 3 shows clamping device 1 in its release position, in which piston 5 is lifted up, by impingement of a pressure medium on pressure chamber 4, against the return force of cup spring packet 9 so that holding ring 14 is axially retained between snap ring 15 and piston 5. In this release position, tapered surface 19 of piston 5 and oblique surfaces 18 of clamping tongues 13 are not in engagement with one another, so that upon insertion of a draw-in bolt 11 into receptacle 10, or upon withdrawal of a draw-in bolt 11 out of receptacle 10, clamping tongues 13 can deflect elastically outward when the thickened bolt head 11 passes through clamping tongues 13. During the insertion operation, the long guide collar 11b of draw-in bolt 11, and the correspondingly long passthrough bore 12 of cover 6, prevent draw-in bolt 11 from tilting or sliding out of the guidance system; this is particularly important for automated production processes. When pressure chamber 4 is then depressurized, cup spring packet 9 presses piston 5 downward. Its tapered surface 19 thus comes into contact with oblique surfaces 18 of clamping tongues 13 so that the latter are prevented by piston 5 from deflecting outward, and draw-in bolt 11 is thus securely retained. As the downward motion continues, the entire collet chuck with draw-in bolt 11 is pulled into clamping device 1.

When pressure chamber 4 is once again impinged upon by a hydraulic medium, at first only piston 5 is moved axially upward, so that tapered surface 19 and oblique surfaces 18 conic out of engagement with one another. After a certain travel piston 5 then comes into contact, in the bottom region of receptacle 10, with bolt head 11a, so that the latter is also lifted up. In the release position depicted in FIG. 3, draw-in bolt 11 can then be removed from receptacle 10, in which context clamping tongues 13 can be slightly spread apart elastically in order to snake room for the thicker bolt head 11a.

In the embodiment depicted in FIG. 3, clamping device 1 is embodied as a so-called flush-mount cassette, which can be inserted into a cutout of a machine table or the like. In this embodiment, a spacer ring 20 is slid onto base element 2 from the side opposite flange 2, its outside diameter corresponds approximately to the outside diameter of base element flange 2, so that clamping device 1 assumes a compact cylindrical shape. The outer rim of cover 6 is moreover embodied as a centering surface with which clamping device 1 can be centered in the machine table cutout. In this embodiment, retention of clamping device 1 on the machine table is accomplished by mans of six passthrough screws that are provided alternatingly with screws 7 with which cover 6 is attached to base element 2 and that pass axially through cover 6, base element 2, and space ring 20—for which purpose passthrough bores 24a, 24b, 24c are provided in the components—and are screwed into the machine table.

The clamping device depicted in FIGS. 1 and 2, on the other hand, is embodied as a so-called surface-mount cylinder, which is to be mounted on a machine table or the like. Clamping device 1 has for that purpose, instead of a spacer ring 20, a mounting flange 21 that, as is particularly evident from FIG. 1, has four elongated holes 22 extending in the circumferential direction, with which clamping device 1 can be bolted immovably onto the machine table. In this embodiment a fluid conduit 23, through which hydraulic medium can be conveyed to pressure chamber 4, is also configured in mounting flange 21.

As with the flush-mount cassette, retention of mounting flange 21 on base element 2 is accomplished by means of six passthrough screws that are provided alternatingly with screws 7 with which cover 6 is attached to base element 2 and which engage through passthrough holes 24a, 24b in cover 6 and in base element 2 and are screwed into mounting flange 21. The arrangement is such that mounting flange 21 of the surface-mount cylinder can easily be replaced with spacer ring 20 of the flush-mount cassette, so that the clamping device according to the present invention can be used selectably as a flush-mount cassette or a surface-mount cylinder.

I claims:

1. A clamping device for retaining a draw-in bolt (11) comprising:

a receptacle (10) into which the draw-in bolt (11) is insertable;

a clamping mechanism disposed within said receptacle (10) for retaining the draw-in bolt (11) therein, said clamping mechanism having a collet chuck having several clamping tongues (13), each of said tongues having a first end retained on a holding element (14) disposed and free floating within said receptacle (10) and a second end radially movable between an inner clamping position and an outer release position, said holding element and said clamping tongues axially displaceable and disposed within said receptacle with radial clearance;

a piston (5) operably associated with said clamping mechanism and movable between a first position and a second position, said first position causing said second end to be in said release position, and said second position causing said second end to be in said clamping position, the draw-in-bolt lockable in said receptacle (10) when said second end is in said clamping position.

2. The clamping device as defined in claim 1, wherein the clamping tongues (13) are in contact with a contact surface (17) of a draw-in bolt (11) inserted into the clamping device when said second end is in said clamping position, the contact surface (17) being provided in a transition region adjacent a thickened bolt head (11a) of the draw-in bolt.

3. The clamping device as defined in claim 1, wherein said second ends include oblique surfaces (18) that diverge outwardly in conical form, said oblique surfaces engagable with a tapered surface (19) formed in said piston (5) so that said second ends are displaced radially inward against a draw-in bolt (11) inserted into the receptacle (10) when the piston (5) is in said second position.

* * * * *